(12) United States Patent
Grigoriev et al.

(10) Patent No.: US 9,088,416 B2
(45) Date of Patent: Jul. 21, 2015

(54) METHOD FOR SECURELY ASSOCIATING DATA WITH HTTP AND HTTPS SESSIONS

(75) Inventors: Nikolai Grigoriev, Brossard (CA); Haraldur Thorkelsson, Montréal (CA); Sylvain Legault, Pierrefonds (CA); Alain Caron, Montreal (CA)

(73) Assignee: Synchronica plc, Kent (GB)

( * ) Notice: Subject to any disclaimer, the term of this patent is extended or adjusted under 35 U.S.C. 154(b) by 1136 days.

(21) Appl. No.: 12/094,894

(22) PCT Filed: Nov. 24, 2006

(86) PCT No.: PCT/CA2006/001931
§ 371 (c)(1),
(2), (4) Date: Jun. 13, 2008

(87) PCT Pub. No.: WO2007/059628
PCT Pub. Date: May 31, 2007

(65) Prior Publication Data
US 2008/0307517 A1    Dec. 11, 2008

Related U.S. Application Data

(60) Provisional application No. 60/739,440, filed on Nov. 25, 2005.

(30) Foreign Application Priority Data

Nov. 24, 2005   (CA) ..................................... 2527550

(51) Int. Cl.
*H04L 29/06*    (2006.01)
*H04L 9/32*     (2006.01)
*H04L 29/08*    (2006.01)

(52) U.S. Cl.
CPC .......... *H04L 9/3213* (2013.01); *H04L 63/0428* (2013.01); *H04L 63/168* (2013.01); *H04L 67/02* (2013.01)

(58) Field of Classification Search
CPC ..... H04L 67/02; H04L 63/168; H04L 67/146; H04L 9/3213
USPC .......................... 713/150, 153; 726/2–5, 9, 10
See application file for complete search history.

(56) References Cited

U.S. PATENT DOCUMENTS 5,485,519 A * 1/1996 Weiss .............................. 713/185
5,542,046 A * 7/1996 Carlson et al. .................... 726/5

(Continued)

FOREIGN PATENT DOCUMENTS

WO     WO 03/065640 A1    8/2003

OTHER PUBLICATIONS

Covington et al.; A context-aware security architecture for emerging applications; Published in: Computer Security Applications Conference, 2002. Proceedings. 18th Annual; Date of Conference: 2002; pp. 249-258; IEEE Xplore.*

(Continued)

*Primary Examiner* — Bradley Holder
(74) *Attorney, Agent, or Firm* — Soquel Group LLC

(57) ABSTRACT

A computing system, method and product comprising a server, a mobile device comprising a client interconnected with the server via a data network, the client identified by a credential which is unavailable to the client and an intermediate node interconnected to the client and the server via the data network wherein the credential is available to the intermediate node. Upon reception of a service request from the client at a first server address the server redirects the client to transmit the service request to a second server address via the intermediate node together with a token, wherein the intermediate node appends a credential identifying the client to the redirected service request and the token and relays the redirected service request, the token and the credential to the second server address.

23 Claims, 13 Drawing Sheets

(56) References Cited

U.S. PATENT DOCUMENTS

| | | | |
|---|---|---|---|
| 5,841,866 A * | 11/1998 | Bruwer et al. | 705/66 |
| 5,943,423 A * | 8/1999 | Muftic | 705/67 |
| 6,253,327 B1 | 6/2001 | Zhang et al. | |
| 6,263,432 B1 * | 7/2001 | Sasmazel et al. | 713/100 |
| 6,339,423 B1 * | 1/2002 | Sampson et al. | 715/854 |
| 6,351,817 B1 * | 2/2002 | Flyntz | 726/4 |
| 6,385,729 B1 * | 5/2002 | DiGiorgio et al. | 726/9 |
| 6,389,542 B1 * | 5/2002 | Flyntz | 726/17 |
| 6,397,261 B1 * | 5/2002 | Eldridge et al. | 713/171 |
| 6,418,420 B1 * | 7/2002 | DiGiorgio et al. | 705/40 |
| 6,636,973 B1 * | 10/2003 | Novoa et al. | 726/20 |
| 6,804,786 B1 * | 10/2004 | Chamley et al. | 726/20 |
| 6,963,740 B1 * | 11/2005 | Guthery et al. | 455/410 |
| 7,024,689 B2 * | 4/2006 | O'Donnell et al. | 726/4 |
| 7,234,158 B1 * | 6/2007 | Guo et al. | 726/2 |
| 7,249,375 B2 * | 7/2007 | Bhatia et al. | 726/8 |
| 7,653,938 B1 * | 1/2010 | Touitou et al. | 726/14 |
| 7,681,229 B1 * | 3/2010 | Ebrahimi et al. | 726/4 |
| 7,685,300 B2 * | 3/2010 | Burrows et al. | 709/230 |
| 8,042,163 B1 * | 10/2011 | Karr et al. | 726/9 |
| 2002/0147924 A1 * | 10/2002 | Flyntz | 713/200 |
| 2003/0005300 A1 * | 1/2003 | Noble et al. | 713/172 |
| 2003/0200332 A1 * | 10/2003 | Gupta et al. | 709/238 |
| 2004/0006699 A1 * | 1/2004 | von Mueller et al. | 713/185 |
| 2005/0088971 A1 * | 4/2005 | Qing et al. | 370/230 |
| 2005/0102422 A1 * | 5/2005 | Yamamote et al. | 709/238 |
| 2005/0262026 A1 * | 11/2005 | Watkins | 705/67 |
| 2006/0136717 A1 * | 6/2006 | Buer et al. | 713/155 |
| 2006/0195893 A1 | 8/2006 | Caceres et al. | |
| 2006/0270386 A1 * | 11/2006 | Yu et al. | 455/406 |

OTHER PUBLICATIONS

Patel et al.; Ticket based service access for the mobile user; Published in: Proceeding MobiCom '97 Proceedings of the 3rd annual ACM/IEEE international conference on Mobile computing and networking; 1997; pp. 223-233; ACM Digital Library.*

International Search Report and Written Opinion received in corresponding Patent Cooperation Treaty Application No. PCT/CA2006/001931, dated Feb. 21, 2007, 8 pages.

International Preliminary Report on Patentability received in corresponding Patent Cooperation Treaty Application No. PCT/CA2006/001931, dated May 27, 2008, 7 pages.

Fielding, et al., "Hypertext Transfer Protocol—HTTP/1.1", Network Working Group, Request for Comments: 2616, Obsoletes: 2068, Category: Standards Track, Jun. 1999, 150 pages.

Rescorla, "HTTP Over TLS", Network Working Group, Request for Comments: 2818, Category: Informational, May 2000, 6 pages.

Friedman et al., "Hypertext Transfer Protocol—HTTP/1.1," [online] [retrieved Mar. 2, 2011]. Retrieved from the Internet: <http://www.ietf.org/rfc/rfc2616.txt>. 165 pages.

Rescorla et al., "HTTP Over TLS," [online] [retrieved Mar. 2, 2011]. Retrieved from the Internet: <http://www.ietf.org/rfc/rfc2818.txt>. 7 pages.

Office Action issued in connection with Canadian Patent Application No. 2,632,159, dated Jan. 27, 2011.

* cited by examiner

METHOD FOR SECURELY ASSOCIATING DATA WITH HTTP AND HTTPS SESSIONS

FIELD OF THE INVENTION

The present invention relates to a method for securely associating data with Hypertext Transfer Protocol (HTTP) and HTTPS sessions.

BACKGROUND TO THE INVENTION

The prior art reveals providing access to application services, such e-mail and Instant Messaging (IM), from a mobile device such as a mobile telephone. In order to provide access to such applications, the prior art mobile device is equipped with a client which communicates with a server typically via a plurality of communications networks. For example, a mobile core network provides the wireless interconnection between the mobile device, one or more fixed ground stations, or nodes, and the mobile backbone network which interconnects the nodes and an external network, such as the internet, an X.25 network or the like, which interconnects the mobile backbone network of the mobile core network with the servers of the service provider.

The operator of the core mobile network, typically referred to as a mobile carrier, offers these application services as a "mobile access service" and charges the user of the mobile device for use of such mobile access services. For charging purposes, the mobile carrier requires identification of the user of the mobile access service(s) which is used to identify the mobile user/device but is unrelated to the mobile access service(s) being used.

One example of such an identifier is the Mobile Directory Number (MDN) which for example in a GSM network is the user's unique 16 digit Mobile Station ISDN Number (MSISDN). The MSISDN identifier is available from the mobile GSM device whenever the device is communicating with nodes within the mobile core network (e.g. the Home Location Register, HLR), as it is available at a number of protocol layers. However, when a client resident on the mobile device is communicating with an application located on a server which is outside of the core mobile network, the MSISDN identifier may be unavailable to the client. This can occur, for instance, when the client comprises a downloadable JAVA midlet or the like, and where for security reasons the JAVA machine in the mobile device does not disclose the MSISDN identifier to the JAVA applications that it runs.

The prior art reveals a number of methods for providing identification of the mobile device/user. For example, the prior art reveals the client requesting such identification from an intermediate node in the mobile core network and then inserting this identification by the client into the headers of subsequent transmissions. One drawback of this prior art solution is that the client could insert incorrect (and in the worst case fraudulent) identifiers into the headers as there is no way to adequately verify that the source of the identifier is the intermediate node. Additionally, this prior art implementation provides virtually no control over the clients. For example, there is no way to reset identifiers stored on the client side or to force the clients to validate the identifiers.

The prior art also reveals providing a recognizable transaction (packet) format which is then intercepted by an intermediate node and the requisite identifier inserted into the packet. For example, when HTTP is being used for communicating between client and server, intermediate nodes (such as WAP gateways) can add the identifier, or any other information that is not available to the client for that matter, to the HTTP transaction by adding headers to the HTTP request or response.

One drawback of this prior art approach is that it cannot be used when a secure end-to-end tunnelling protocol, such as HTTPS, is being used as an intermediate node cannot alter the contents of an HTTPS transaction. Such a secure protocol is needed, for example, when confidential information such as user credentials (User ID and/or password) is to be transmitted and at least a portion of the communication path used to transmit the information is via an unsecured network such as the Internet.

Another drawback of the above prior art approach is that the intermediate node cannot distinguish between the different types of transactions which are being routed through the node and as a result the identifier must be inserted in all transactions which increases latency and the requisite bandwidth.

SUMMARY OF THE INVENTION

In order to overcome the above and other drawbacks, there is disclosed a method for establishing an authenticated communication session between a client and a server over a communications network, the client identified by a credential which is unavailable to the client. The method comprises transmitting a service request to the server at a first location, receiving a token and a redirection to a second location from the server, and appending the token to the service request and retransmitting the service request together with the token to the server at the second server location via an intermediate node, wherein the intermediate node appends the credential to the retransmitted service request and transmits the service request, the token and the credential to the server.

There is also disclosed a method for establishing an authenticated communication session between a client and a server over a communications network, the client identified by a credential which is unavailable to the client. The method comprises receiving a service request from the client at a first location, transmitting a redirection to a second location comprising a token to the client, receiving at the second location a redirected service request and the credential from the client via an intermediate node, and transmitting to the client an acknowledgment of correct reception of the redirected service request if the redirected service request includes the token.

Additionally, there is disclosed a computing system comprising a server, a mobile device comprising a client interconnected with the server via a data network, the client identified by a credential which is unavailable to the client, and an intermediate node interconnected to the client and the server via the data network wherein the credential is available to the intermediate node. Upon reception of a service request from the client the server redirects the client to retransmit the service request to the server via the intermediate node together with a token, wherein the intermediate node appends a credential identifying the client to the redirected service request and the token and relays the redirected service request, the token and the credential to the server.

Furthermore, there is disclosed a computer program product in a computer readable medium for establishing an authenticated communication session between a client and a server over a communications network, the client identified by a credential which is unavailable to the client. The product comprises instructions for receiving a token and a redirected service request from the client, instructions for appending the credential to the redirected service request and the token, and instructions for transmitting the redirected service request, the token and the credential to the server.

There is also disclosed a computer program product in a computer readable medium for establishing an authenticated communication session between a client and a server over a communications network, the client identified by a credential which is unavailable to the client. The product comprises instructions for generating a service request, instructions for transmitting the service request to the server, instructions for receiving a token, a redirection and an indication that the service request is to be retransmitted to said server via an intermediate node from the server, and instructions for appending the token to the service request and retransmitting the service request together with the token to the server via the intermediate node.

Also, there is disclosed a computer program product in a computer readable medium for establishing an authenticated communication session between a client and a server over a communications network, the client identified by a credential which is not available to the client. The product comprises instructions for receiving a service request from the client, instructions for sending to the client a redirection comprising a first token and an indication that the service request should be retransmitted to the server via an intermediate node, and instructions for receiving a redirected service request, the first token and the credential from the intermediate node.

BRIEF DESCRIPTION OF THE FIGURES

FIGS. 3A through 3J provide diagrammatic representations of the sequence of transactions used to associate data with a connection in accordance with a series of alternative illustrative embodiments of the present invention.

DETAILED DESCRIPTION OF THE ILLUSTRATIVE EMBODIMENTS

Figure 1:
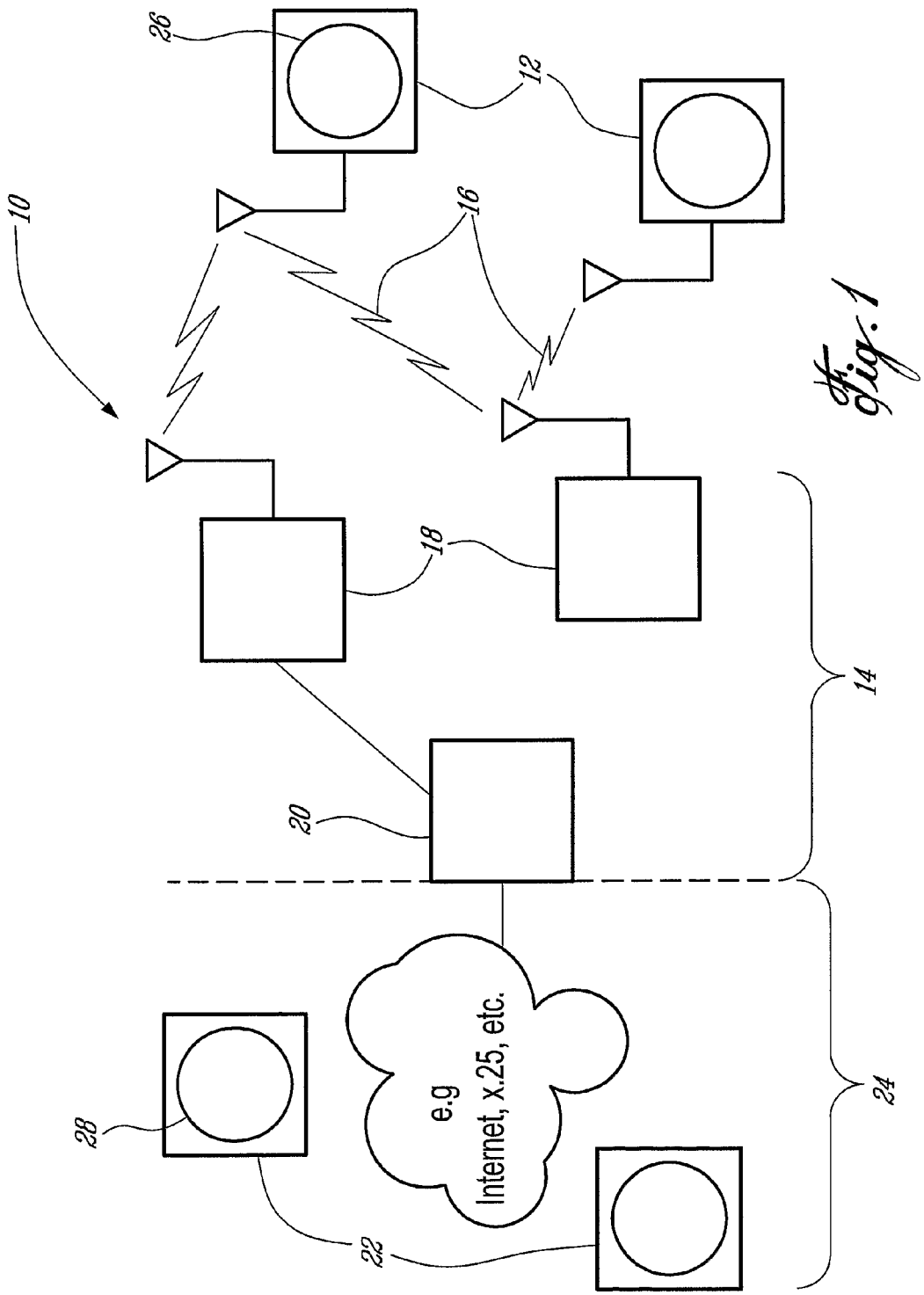
FIG. 1 is a schematic diagram of a mobile communications network in accordance with an illustrative embodiment of the present invention.

Referring now to FIG. 1, a mobile communications network, generally referred to using the reference numeral 10, will now be described. The mobile network 10 is comprised of a number of mobile devices 12 which, for the purposes of transmitting data, communicate with a mobile core network 14 via a wireless connection 16 and one or more ground stations 18. The mobile core network 14 is additionally comprised of one or more intermediate nodes as in 20 (for example, a WAP Gateway or the like) which, amongst other functions, relay data, typically in the form of packets, received from the mobile devices 12 to external devices 22 located on an external network 24, such as the Internet, an X.25 network, or the like.

Each of the mobile devices 12 additionally comprises at least one client 26, such as a JAVA midlet, which communicates with a server application 28 located on the external device 22. The client 26 communicates, or transacts, with the server 28 using a predefined protocol such as TCP/IP, HTTP, HTTPS, or the like.

Figure 2A:
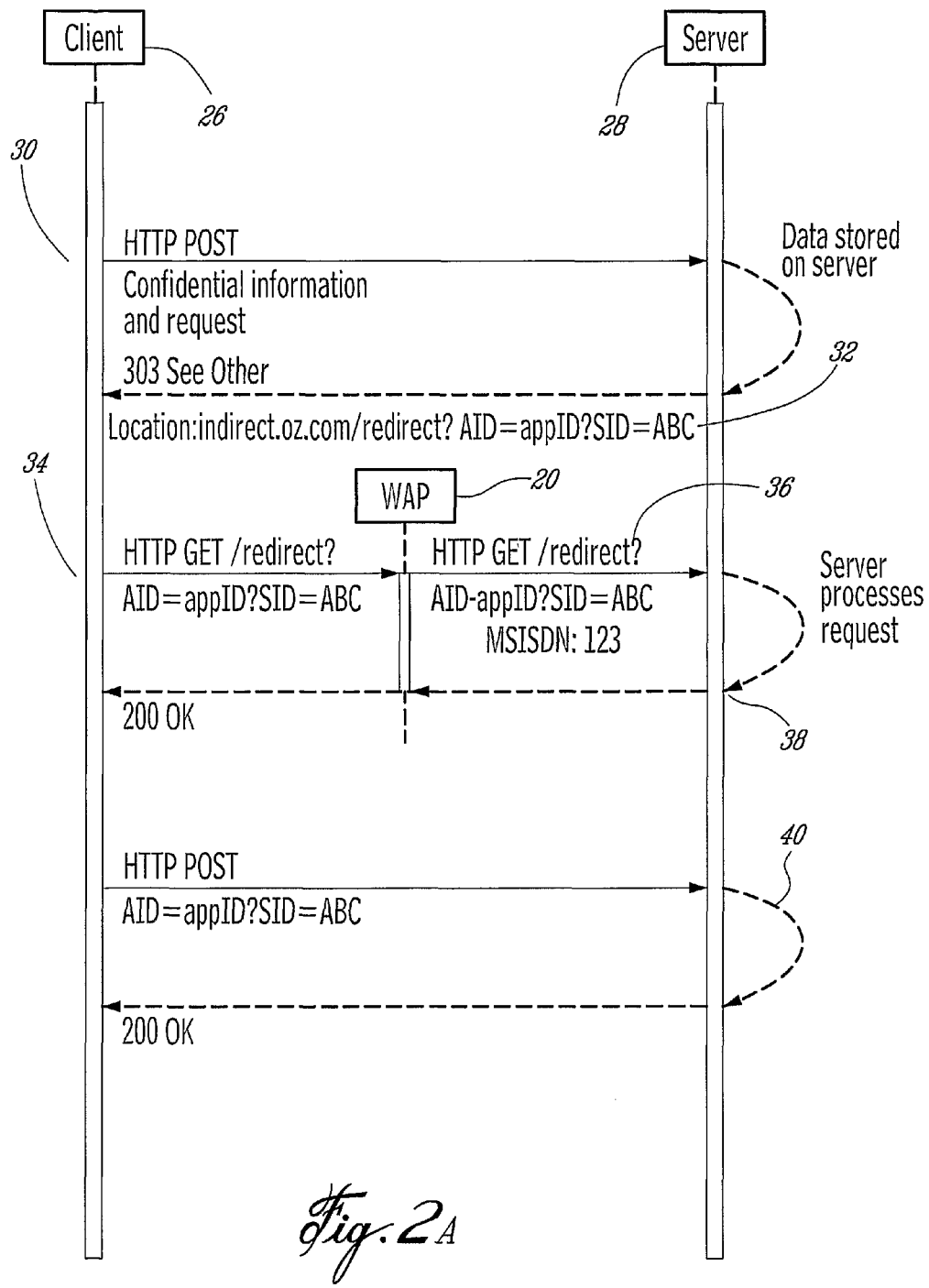
FIG. 2A and FIG. 2B provide diagrammatic representations of sequences of transactions used to associate data with a connection in accordance with a pair of prior art embodiments.

Referring now to FIG. 2A in addition to FIG. 1, in a first prior art method, when a client as in 26 wishes to initiate a transaction with a server 28, at an initial step 30 the client 26 sends an initial message, for example an HTTP Request with the method indicating Post typically by initiating a TCP connection with the server 28 on port number 80 (which is the default port for HTTP). In this case, the network that is used to transport this message is trusted, hence HTTP can be used (i.e., the transport protocol does not need to be secure because the underlying network is trusted). The initial HTTP Request may indicate the user's credential in a service that the user is attempting to access (for example, UserID and password in an e-mail service). Of note, and as discussed above, the message does not contain the mobile credential of the user (e.g., the MSISDN).

Still referring to FIG. 2A, at a second step 32 the server 28 receives the initial message and, for example, may validate that the UserID and password combination are valid (for example, by comparing the received data with data locally stored on the server 28 or by verifying with an external third party server (not shown)). However, the server 28 must still obtain the mobile credentials of the user. For this purpose, the server 28 re-directs the client 26 to an intermediate node 20 that is able to provide the mobile credentials of the user to the server 28 by inserting them into a subsequent data transmission. Specifically, the server 28 at step 32 returns a response to the client 28 including:

a redirection indication (illustratively when using HTTP the 303 code) which informs the client 26 that the next request should be redirected to the location, or Uniform Resource Identifier (URI), indicated in the redirection;

a location (or URI), illustratively "indirect.oz.com" as provided for in FIG. 2A. The location is the address of the server 28 but also serves to indicate to the client 26 that the intermediate node 20 should be used as a proxy through which the server 28 can be reached. The address of the intermediate node 20, which is provided to the client 26 for example during an earlier configuration step, is well known to the client 26; and Application ID (AID) and Session ID (SID) identifying the specific client 26. These parameters can later be used by the client 26 to identify itself to the server 28. Note that these parameters may have been initially communicated (at least in part) between the client 26 and the server 28 during the initial HTTP Post transactions of step 30 and step 32.

At step 34 the client 26 directs a next request (for example an HTTP Get) to the intermediate node 20. As discussed above, the address of the intermediate node 20 is well known and provided to the client 26 during an earlier configuration step (not shown). This request also comprises the AID and SID that will enable the server 28 to identify the particular client 26 originating the request when it receives the request from the intermediate node 20. Note that the network which is used to support the transaction in step 34 may be different from the network used in step 30. In this case, the network used in step 34 is trusted, as in step 30. For example, the network used in step 30 can comprise the network of the mobile operator and a leased line connecting the client 26 to a server 28 residing in a $3^{rd}$ party hosting center, while the network used in step 34 may be simply the network of the mobile carrier connecting the client 26 to an intermediate node 20 residing within this network (typically, this element would be a WAP Gateway or a Gateway GPRS Support Node (GGSN)).

At step 36, the intermediate node 20 inserts the mobile credentials (for example, the MSISDN) of the user and forwards the transmission, illustratively in the form of an HTTP Get, to the server 28 using the location received from the client 26.

At step 38 the server 28 receives the message from the intermediate node. This message typically contains:

AID, SID, which enables the server 28 to identify the client 26 originating the request; and MSISDN, that is the mobile credentials of the user.

On completion of step 38 the server 28 is informed of the mobile credential of the end user associated with the client 26.

Subsequent transactions initiated by the client 26, as illustrated in step 40, can include the AID, SID thereby enabling the server 28 to identify the client 26. These are typically carried out using a direct HTTP interconnection between the client 26 and the server 28. As the MSISDN has now been made available to the server 28 and associated with the AID and SID, the server 28 can then respond directly to these transactions.

Figure 2B:
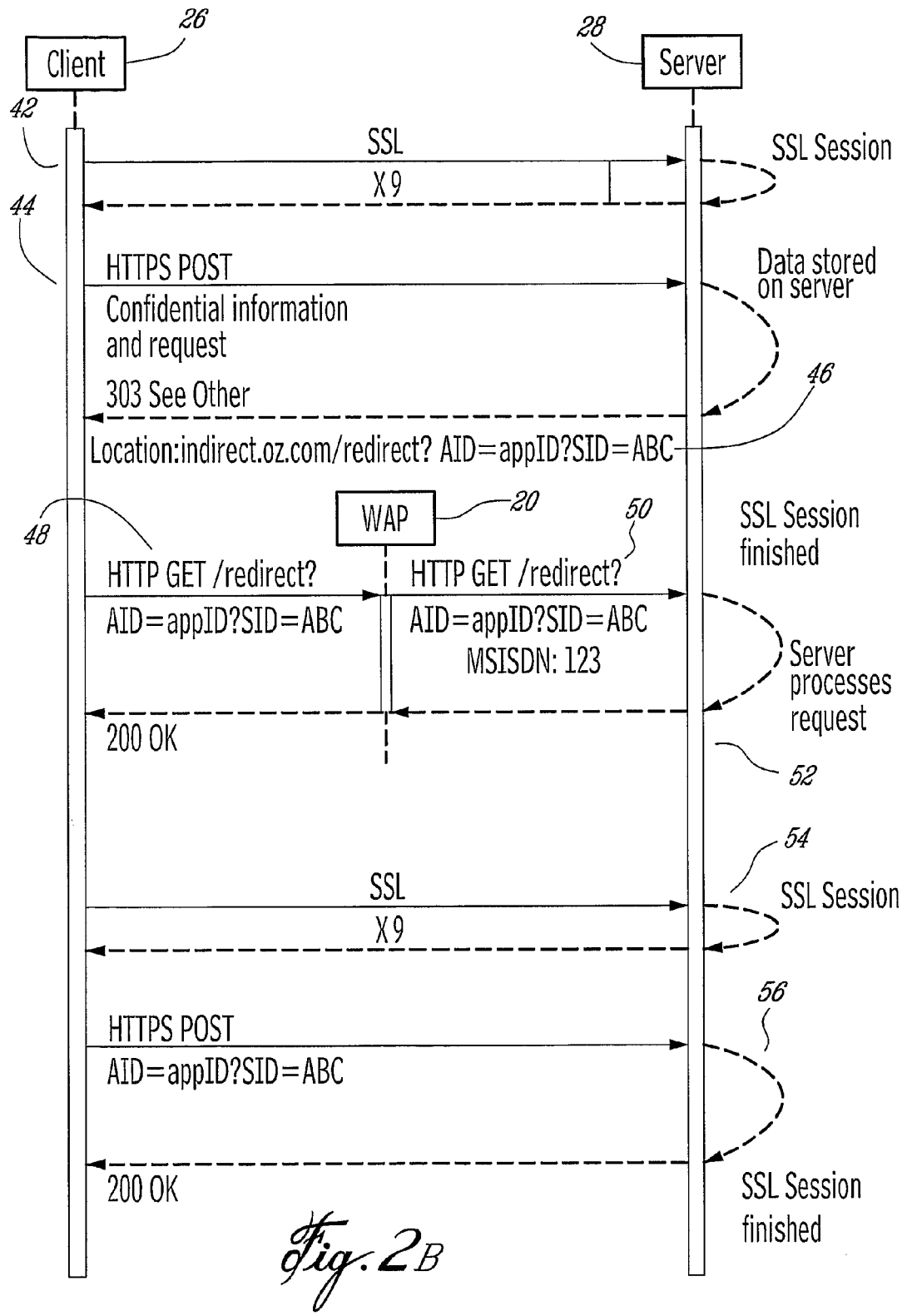

Referring now to FIG. 2B in addition to FIG. 1, in a second prior art method the underlying networks used for direct interconnection between the client 26 and the server 28 are untrusted and therefore use must be made of a secured interconnection between client 26 and server 28 in such cases. At initial step 42 the client 26 establishes a Secure Sockets Layer (SSL) connection with the server 28. As known in the art SSL provides cryptographic protocols which allow for secure communications. The connection provided by SSL is an opaque end-to-end tunnel between the client 26 and the server 28. An SSL connection requires nine (9) transactions in order to be established.

Still referring to FIG. 2B, at step 44, once the SSL connection (or tunnel) has been established, the client 26 uses HTTPS instead of HTTP to communicate the initial request (HTTP Post) to the server 28. In this regard, HTTPS is the same as HTTP with the exception that a different default port (443 versus 80 for HTTP) is used and an additional encryption/authentication layer is provided between HTTP and TCP.

At step 46, the server 28 similarly responds using HTTPS illustratively providing the same information as discussed hereinabove in reference to FIG. 2A. Once step 46 is completed, the client 26 tears down the SSL tunnel used to communicate with the server 28.

Subsequent steps 48, 50 and 52 are identical to steps 34, 36 and 38 as described hereinabove with reference to FIG. 2A.

At step 54 an SSL tunnel is again established between client 26 and server 28. Step 56 is essentially identical to step 40 as described hereinabove with reference to FIG. 2A with the exception that HTTPS is used instead of HTTP.

Similarly as to the network as described hereinabove with reference to FIG. 2A, the network used to carry the transaction in step 48 may be different from the network used in step 44. In this case, the network used in step 48 is assumed to be secure, but not the network used in step 44. For example, the network used in step 44 can comprise the network of the mobile operator and the Internet to connect the client 26 to a server 28 residing in a third party hosting centre, while the network used in step 48 may be the secure network of the mobile carrier connecting the client 26 to a network element residing within this network (again, this element would typically be a WAP Gateway or a GGSN).

Still referring to FIG. 2B, it is assumed that the network used to support the transactions in step 54 and step 56 is the same as the one used in step 44 and step 46, and hence that this network is not secure. It is for this reason that the SSL tunnel is re-established in step 54 and that HTTPS is used. A person of skill in the art will understand, however, that if the network used to support the transactions in step 54 and step 56 is secure, then there is no need to re-establish the SSL tunnel and to use HTTPS. In this later case, step 54 would be unnecessary and step 56 would be the same as step 40 of FIG. 2A.

Figure 3A:
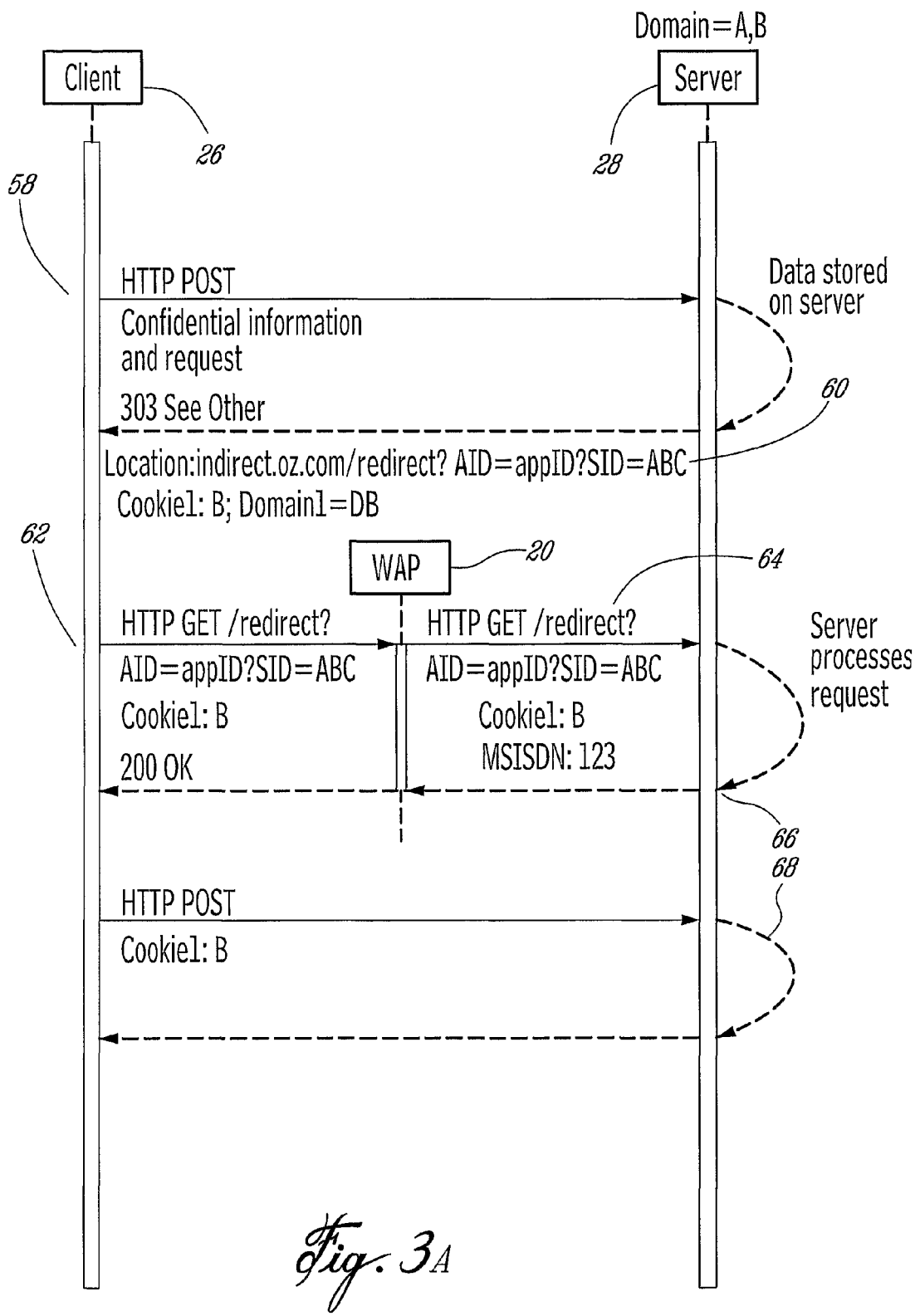

Referring now to FIG. 3A in addition to FIG. 1, and in an accordance with an illustrative embodiment of the present invention, an implementation where the underlying networks are trusted and HTTP can be used is shown. At a first step 58 the client 26 sends an initial message such as an HTTP request using the Post method to the server 28, illustratively located in Domain A. This message may contain the user's credential in a service (for example a UserID/Password) but does not contain the mobile credential of the user (for example an MDN such as the MSISDN). As a result, although the client can log onto the service, there is not yet a way to bill the device, for example by coordinating billing information with the MDN. Upon receiving the message the server 28 may validate that the UserID/Password (for example, by checking the received UserID/Password with data stored locally on the server 28 or by verifying with a third party server (not shown)). The server 28 however still has to obtain the mobile credential of the user associated with the client 26. In order to do this, and as discussed hereinabove in reference to FIG. 2A, the server 28 re-directs the client to an intermediate node 20, illustratively located in Domain B, that will be able to insert the mobile credential of the user and then to provide it to the server 28. Specifically, at step 60 the server 28 returns in its HTTP response to the initial message:

a redirection status code (303 code) informing the client 26 that the next request should be redirected to the server at the indicated address;

a location (or URI), illustratively "indirect.oz.com" as provided for in FIG. 3A. The location is the address of the server 28 to which the client 26 is to be redirected but also serves to indicate to the client 26 that the intermediate node 20 should be used as a proxy through which the server 28 can be reached. The address of the intermediate node 20, which is provided to the client 26 for example during an earlier configuration step, is well known to the client 26. Of note is that, in an alternative embodiment the location (or address) provided by the server 28 to the client 26 is the same as that used previously by the client 26 to transmit the initial message, but with the addition that the redirection includes an indication, such as a flag or the like, which indicates to the client 26 that the service request should be retransmitted to the server via the intermediate node 20; and an Application ID (AID) and Session ID (SID) identifying the specific client 26. These parameters can later be used by the client 26 to identify itself to the server 28. Note that these parameters may have been initially communicated (at least in part) by the client in the initial HTTP Post transaction in step 58.

Illustratively, in a GSM system when the client 26 sends the redirected HTTP request to the intermediate node 20 (for example a Serving GPRS Support Node, SGSN), the request includes an identification of the originating device, for example the International Mobile Subscriber Identify (IMSI). The IMSI is typically used by the SGSN to validate that the client in question is entitled to use the requested telecommunications services. Confirmation of entitlement is typically provided by another device within the GSM system (not shown) which also provides back the MSISDN associated with that IMSI to the SGSN.

Additionally, at step 60 the server 28 returns in its HTTP response to the initial message:

a Cookie: a secret token provided by the server 28, and which is typically designed to be difficult to guess. This Cookie can also be used to subsequently uniquely identify the client 26. Illustratively, in FIG. 3A the Cookie is identified as "Cookie1" and is assigned the value B; and a Domain: an optional parameter indicating a domain associated with the Cookie which is used to identify a domain associated with the server 28.

Illustratively, in order to be difficult to guess the Cookies are formed of chains of 32 characters (128 bits) generated based on, for example, an IP address, a sequence number, a time stamp and a random seed.

Illustratively, in FIG. 3A the Domain is identified as Domain1 and is assigned the value DB. Illustratively, if the Domain is not provided in the response message, the client 26 could assume that the domain of the server 28 at the second location is the same as that of the server 28 at the first location. FIG. 3A provides the case where the domain of the server 28 at the second location is in a different domain DB than the domain DA of the server 28 and hence the response identifies the domain DB of the server 28 at the second location.

At step 62 the client 26 transmits its next request, illustratively an HTTP Request using the Get method which is directed to the server location previously provided by the server 28 (illustratively "indirect.oz.com"), to the intermediate node 20, whose address was provided to the client 26 during an earlier configuration step (not shown) and therefore well known. This request also comprises the AID, SID and Cookie B that will subsequently be used by the server 28 to identify the particular client 26 originating the request upon reception of the request from the intermediate node 20. In addition, and as will now be clear to a person of ordinary skill in the art, use of the Cookie enables the server 28 to verify that the client 26 originating the request is indeed the client to which the server 28 previously transmitted the Cookie in step 60.

Note that the network used to support the transaction in step 62 may be different from the network used in step 58, similar to as already described hereinabove in reference to FIG. 2A.

At step 64 the intermediate node 20 inserts the mobile credential of the user (illustratively the MSISDN) into the transaction. The intermediate node 20 subsequently forwards the request to the server 28 at the server location provided by the client in the request sent at step 62.

At step 66 the server 28 receives the message from the intermediate node 20. This message illustratively contains:

AID, SID and Cookie1, thereby enabling the server 28 to identify the particular client 26 originating the request, and enabling the server 28 to verify that the client 26 originating the request is indeed the client 26 to which the server 28 previously transmitted the Cookie.

the mobile credential of the user (for example the MSISDN).

Thus, at the end of step 66, the server 28 is aware of the mobile credential of the user associated with the mobile client 26.

At step 68, subsequent or additional transactions initiated by the client 26 require only the inclusion of Cookie1:B to enable the server 28 to identify the client 26, and may be directed by the client 26 directly to the server 28 (although in a given embodiment the AID and SID could also be included). As will now be apparent to a person of ordinary skill in the art, server 28 is thus able to respond directly to these transactions given that the server 28 already has the MSISDN associated with the client 26 identified by Cookie1:B.

During the subsequent transaction at step 68, it may be desirable to check periodically, for instance every 24 hours, that the MSISDN associated with the client 26 is still valid. This can be accomplished by the server 28 replying periodically to requests from the client 26 with a "303" response, similarly as described in step 60 as discussed hereinabove for example including a new value for the Cookie1:B. This would serve as an indication to the client 26 to redirect requests to the intermediate node 20 giving rise to the sequence as previously described in steps 62 through 66. Upon obtaining confirmation that the MSISDN is still valid, the client would then direct subsequent queries directly to the end server, as in step 68.

Still referring to FIG. 3A, the introduction and use of a Cookie to support the above described transactions results in a number of benefits. For example, if a fraudulent party attempts to impersonate the client 26 that initiated the transaction (in step 58) by generating a fraudulent HTTP GET/redirect? message as in step 62 and guessing AID and SID, the addition of the Cookie requires that the fraudulent party also guess the Cookie, which is a significantly more difficult task as the Cookie has been designed to be difficult to guess, which is not necessarily the case for the AID and SID. In addition, the server 28 can limit the time period within which the Cookie is valid (for example, an average time period over which it would be expected that subsequent step 62 and step 64 would reasonably occur, for example a few minutes) with the Cookie becoming invalid on expiration of this period.

Another benefit resulting from the use of the Cookie is to provide a positive confirmation to the server 28 that the client 26 that initiated the request in step 62 is indeed the same as the client that initiated the earlier communication in step 58, and hence that the MSISDN associated with the client identified by the AID, SID and Cookie in step 64 is the same as the client that initiated the request in step 58.

Still another benefit resulting from the use of the Cookie is that it can be used instead of or in conjunction with AID and SID to identify the client in the subsequent transactions at step 68, thereby making it more difficult for a fraudulent party to impersonate the client in these further transactions.

Figure 3B:
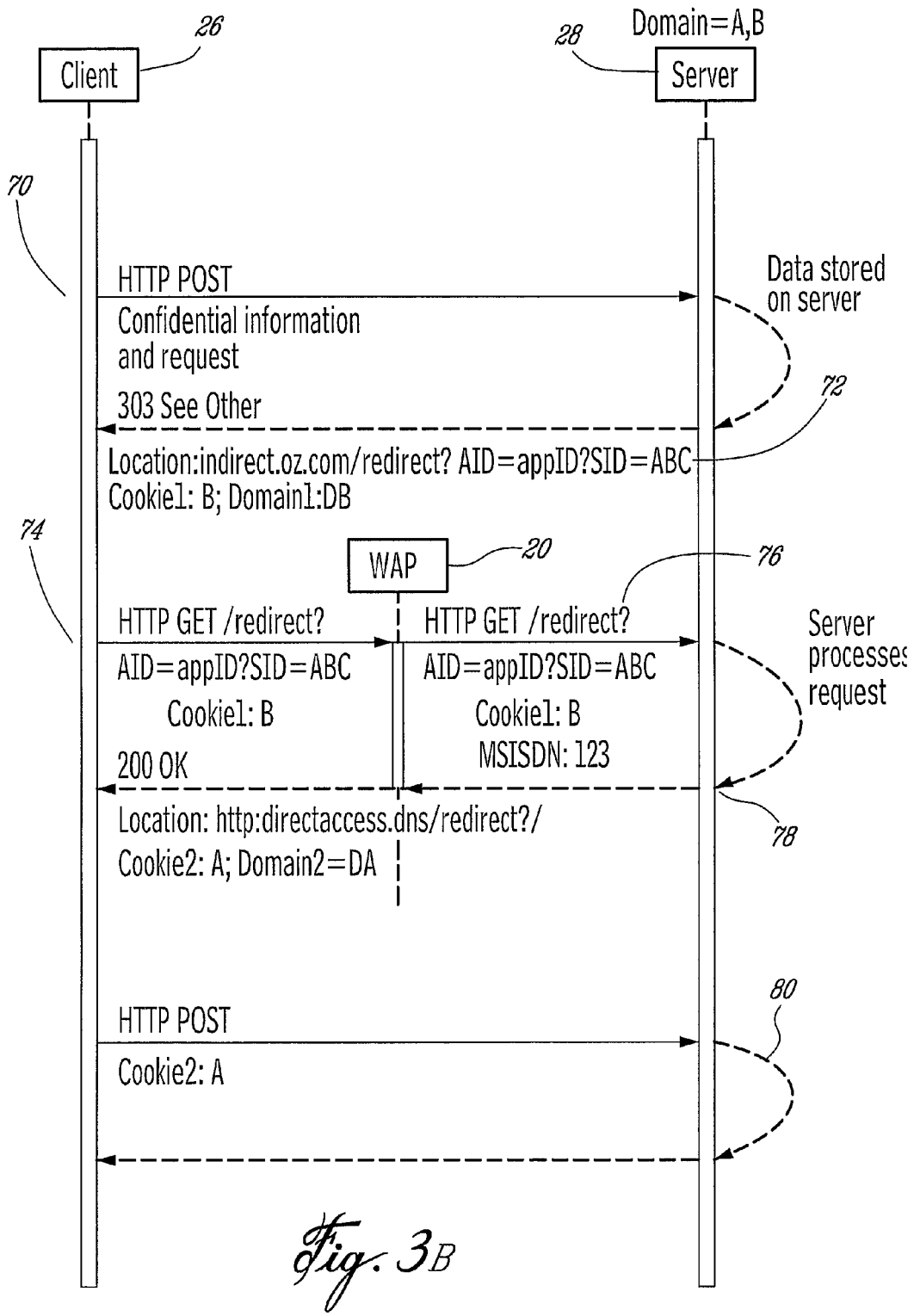

Referring now to FIG. 3B, and in an accordance with an alternative illustrative embodiment of the present invention, steps 70, 72, 74 and 76 are essentially the same as respectively steps 58, 60, 62 and 64 of FIG. 3A. At step 78, however, in addition to positively acknowledging (200 OK) the request initiated in step 74, the server 28 also provides a new location as well as a new cookie (here Cookie2=A), and optionally a new domain (here Domain2=DA). Illustratively, the new domain can point to the same server that received the requests in step 70, but using a different address. Again, the new cookie (Cookie2=A) is a secret token and designed to be hard to guess. The domain identifies the domain of the location to be associated with the new Cookie, and if not provided is assumed to be that of the server 28 which received the initial transaction at step 70.

The above described alternative illustrative embodiment of FIG. 3B provides additional flexibility in enabling the server 28 to use different Cookies for requests incoming directly from the client 26 than for requests incoming from the intermediate node 20. Still referring to FIG. 3B, the server 28 instructs the client 26 to use Cookie B for the requests transiting through the intermediate node 20, and subsequently instructs the client 26 to use the Cookie A for those transactions which are carried out directly between the client 26 and the server 28, optionally providing also a new location (address) to which those transactions are to be directed.

Figure 3C:
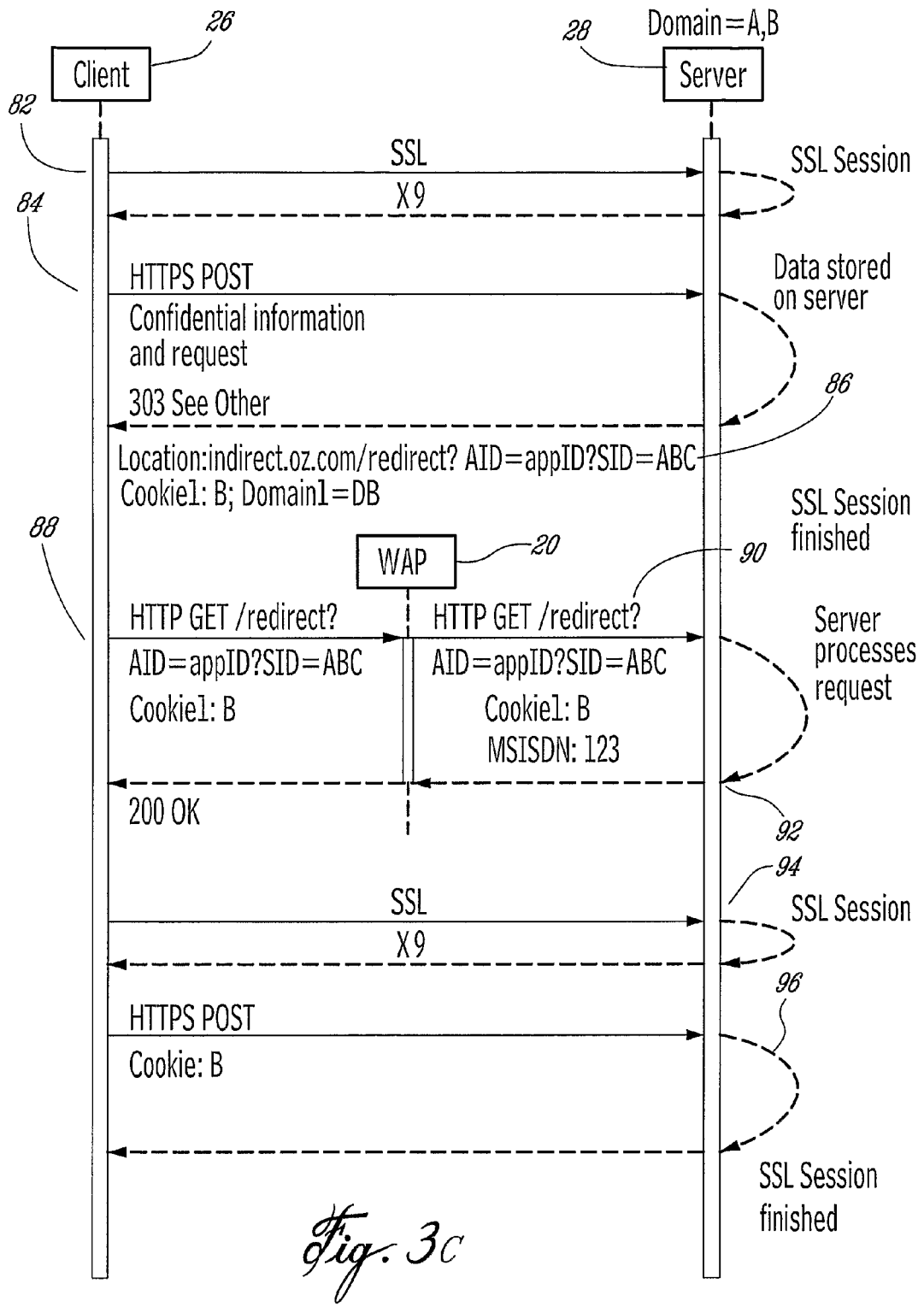

Referring now to FIG. 3C, and in an accordance with a second alternative illustrative embodiment of the present invention, the network used to carry out the initial transactions is untrusted and therefore HTTPS must be used. As discussed above, in order to use HTTPS an SSL connection must first be established between the client 26 and server 28 which is done so at step 82. At step 84, once the SSL tunnel is established, the client 26 uses HTTPS (instead of HTTP) to communicate its initial request to the server 28. The server similarly responds using HTTPS at step 86 following which the SSL connection is torn down by the client (not shown). Step 88, step 90 and step 92 are essentially the same as respectively step 62, step 64 and step 66 as discussed hereinabove in reference to FIG. 3A. At step 94 the SSL tunnel is re-established between client 26 and server 28 and HTTPS is used instead of HTTP for the transmission of subsequent requests between client 26 and server 28.

Similar to step 62 as discussed hereinabove in reference to FIG. 3A, the network used to support the transaction at step 88 may be different than the network used to support the transaction of step 84. In this case, the network used to carry step 88 is trusted. Additionally, it is assumed that the network used to support the subsequent transactions of step 96 is untrustworthy and therefore the SSL tunnel is re-established at step 94. It should be noted, however, that if this network is trusted, then the re-establishment of the SSL tunnel and the use of HTTPS are unnecessary. In such a case, the subsequent transactions of step 96 would essentially be the same as those discussed at step 68 in reference to FIG. 3A.

Figure 3D:
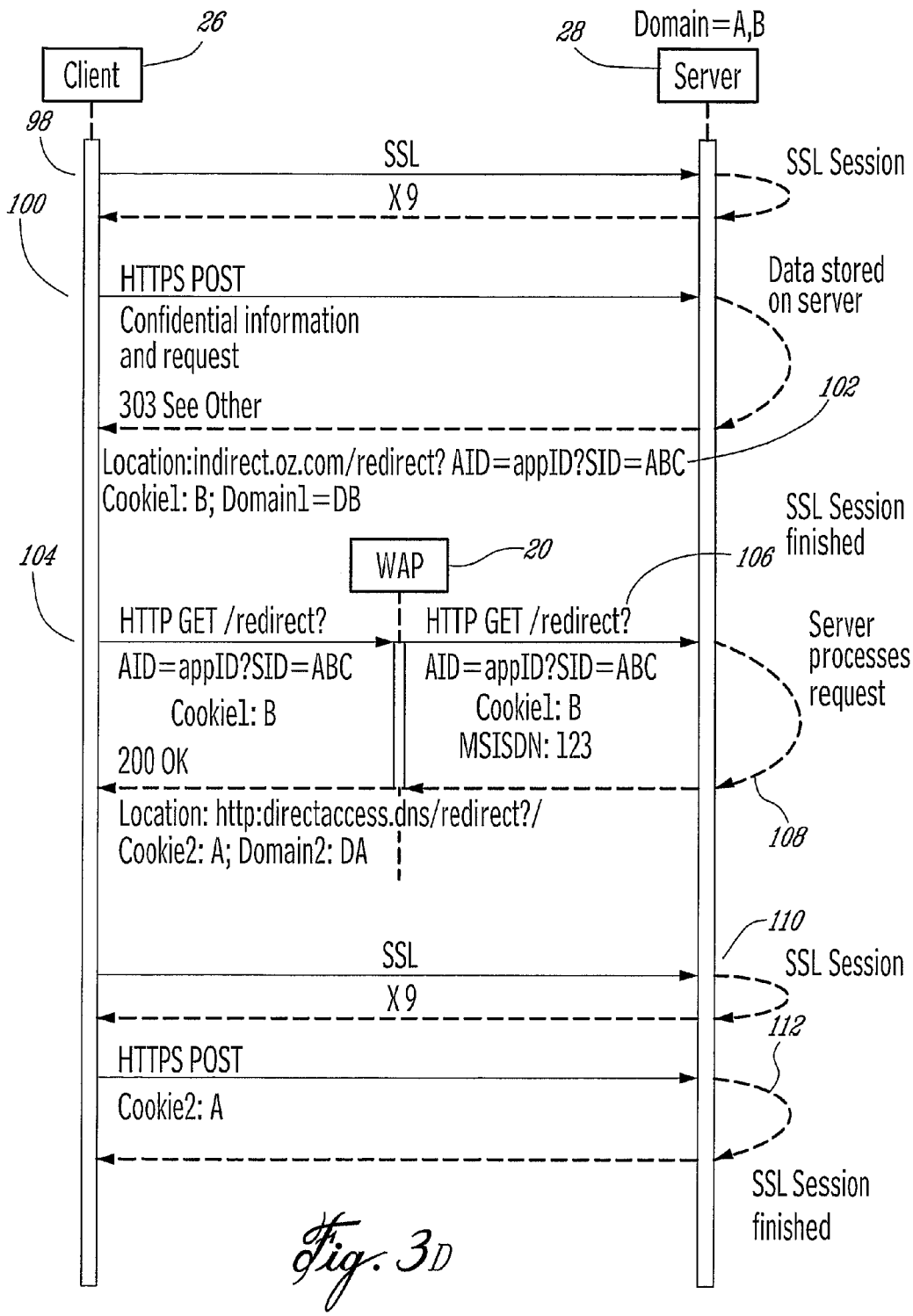

Referring now to FIG. 3D, and in accordance with a third alternative illustrative embodiment of the present invention, again the network used to support the initial transactions at step 98 is untrusted and therefore HTTPS must be used. Steps 98, 100, 102, 104, 106, 108, 110 and 112 of the present illustrative embodiment are essentially the same as respectively steps 82, 84, 86, 88, 90, 92, 94 and 96 as discussed hereinabove in reference to FIG. 3C with the difference that step 108 corresponds to step 78 as discussed hereinabove in reference to FIG. 3B.

Figure 3E:
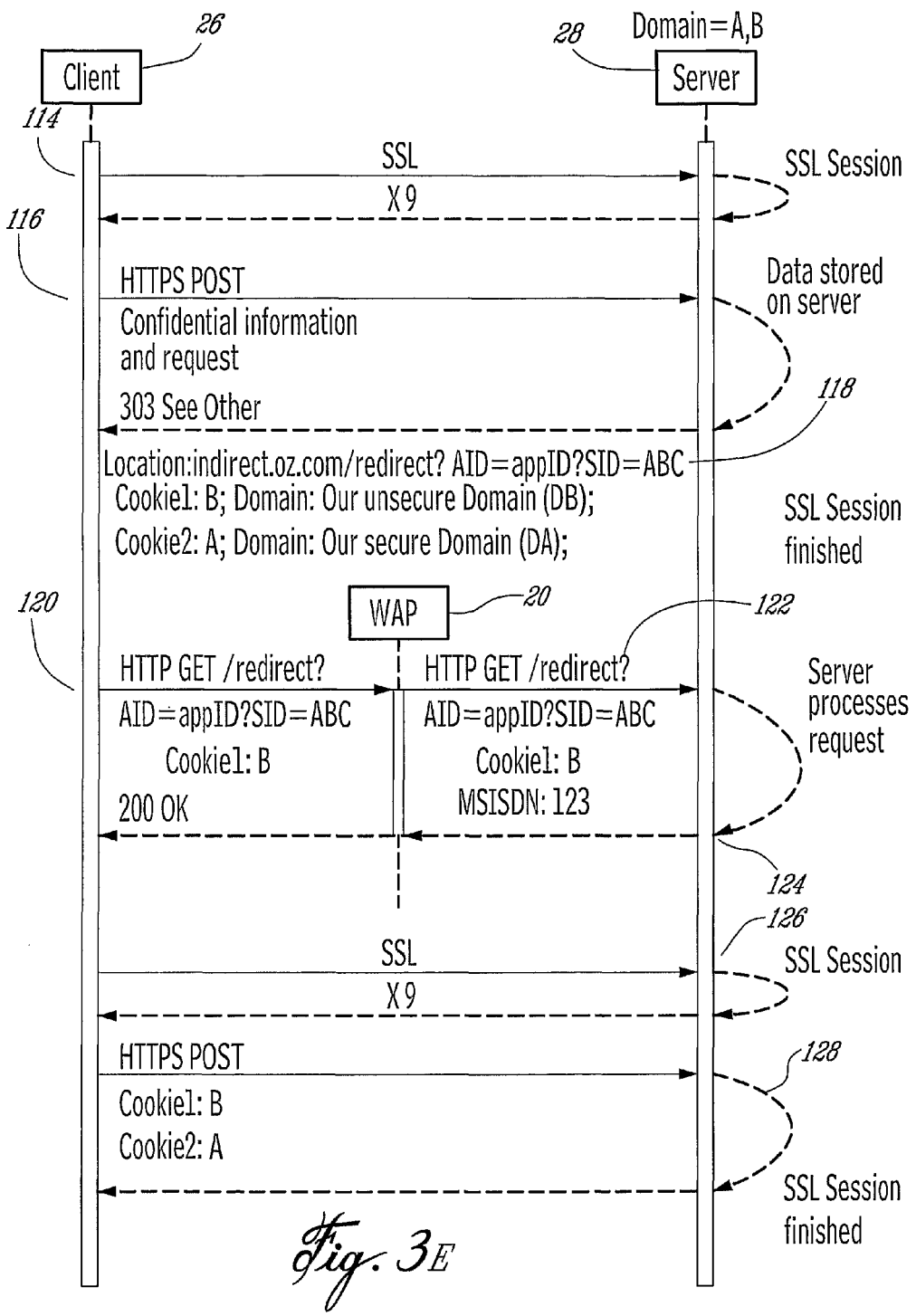

Referring now to FIG. 3E, and in accordance with a fourth alternative illustrative embodiment of the present invention, again the network used to support the initial transactions at step 114 is untrusted and therefore HTTPS must be used. Steps 114, 116, 118, 120, 122, 124, 126 and 128 of the present illustrative embodiment are essentially the same as respectively steps 82, 84, 86, 88, 90, 92, 94 and 96 as discussed hereinabove in reference to FIG. 3C with the exception that at step 118 the server 28 provides a pair of Cookies, herein designated as Cookie1 and Cookie2 and respectively associated with domain A and domain B and at subsequent step 128 both Cookies, that is Cookie 1:A and Cookie 1:B, are used by the client 26 to authenticate itself with the server 28.

The fourth alternative embodiment as described hereinabove in reference to FIG. 3E provides additional security over the third alternative embodiment as discussed hereinabove in reference to FIG. 3D. Indeed, assuming that the HTTP Get/redirect? request transmitted to the intermediate node 20 at step 120 or retransmitted to the server 28 by the intermediate node 20 at step 122 is intercepted by a fraudulent party, the fraudulent party would have gained knowledge of the AID, SID and the Cookie1:B to be used for subsequent secure transactions between the client 26 and server 28. However, during subsequent transactions at step 128 the client 26 would additionally be required to include the second Cookie, that is Cookie2:A which would not be readily available to the fraudulent party. As a result, the fraudulent party would lack the credentials necessary to disguise itself as the client 26 and thus would be unable to undertake fraudulent secure communications with the server 28.

Figure 3F:
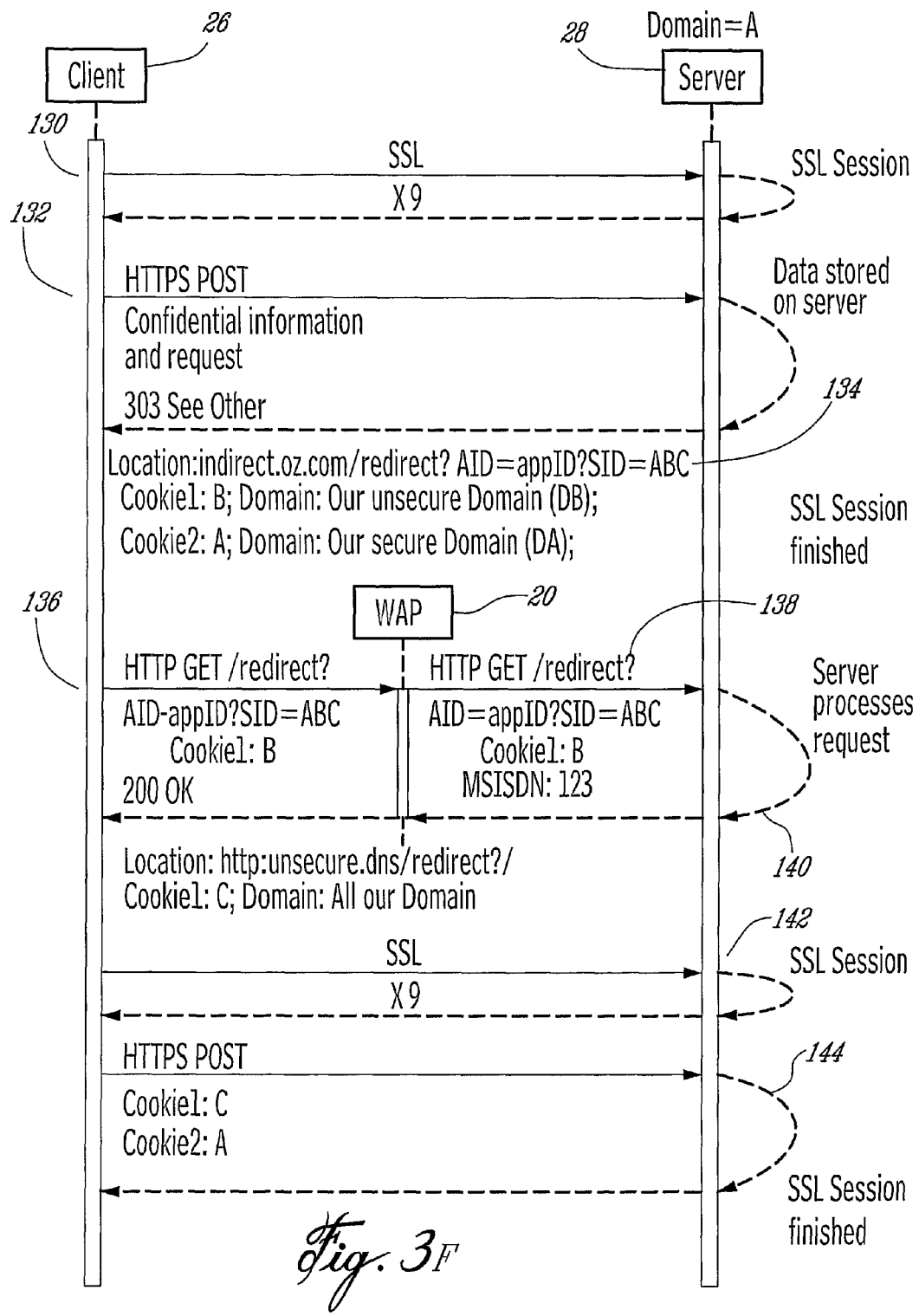

Referring now to FIG. 3F, and in accordance with a fifth alternative illustrative embodiment of the present invention, again the network used to support the initial transactions at step 130 is untrusted and therefore HTTPS must be used. Steps 130, 132, 134, 136, 138, 140, 142 and 144 of the present illustrative embodiment are essentially the same as respectively steps 114, 116, 118, 120, 122, 124, 126 and 128 as discussed hereinabove in reference to FIG. 3E with the exception that at step 140 the server 28 provides a new value for Cookie 1 to the client 26, herein designated as Cookie1:C and associated with domain C. Following re-establishment of the SSL connection at step 142, at subsequent step 144 Cookie 1:A and Cookie 1:C are used by the client 26 to authenticate itself with the server 28. Again, this new location can point to the same server that received the requests in step 132 and/or step 138, but using a different address. Additionally, similar to the other Cookies, the new value of Cookie1 is a secret token and designed to be hard to guess. The new value for domain1 identifies the new domain of the location to be associated with the new value of cookie1, and if not provided is assumed to be that of the original server 28.

One advantage of this fifth alternative illustrative embodiment is the provision of additional flexibility in enabling the server 28 to use different cookies for requests incoming directly from the client 26 than for those requests whose source is an intermediate location.

Figure 3G:
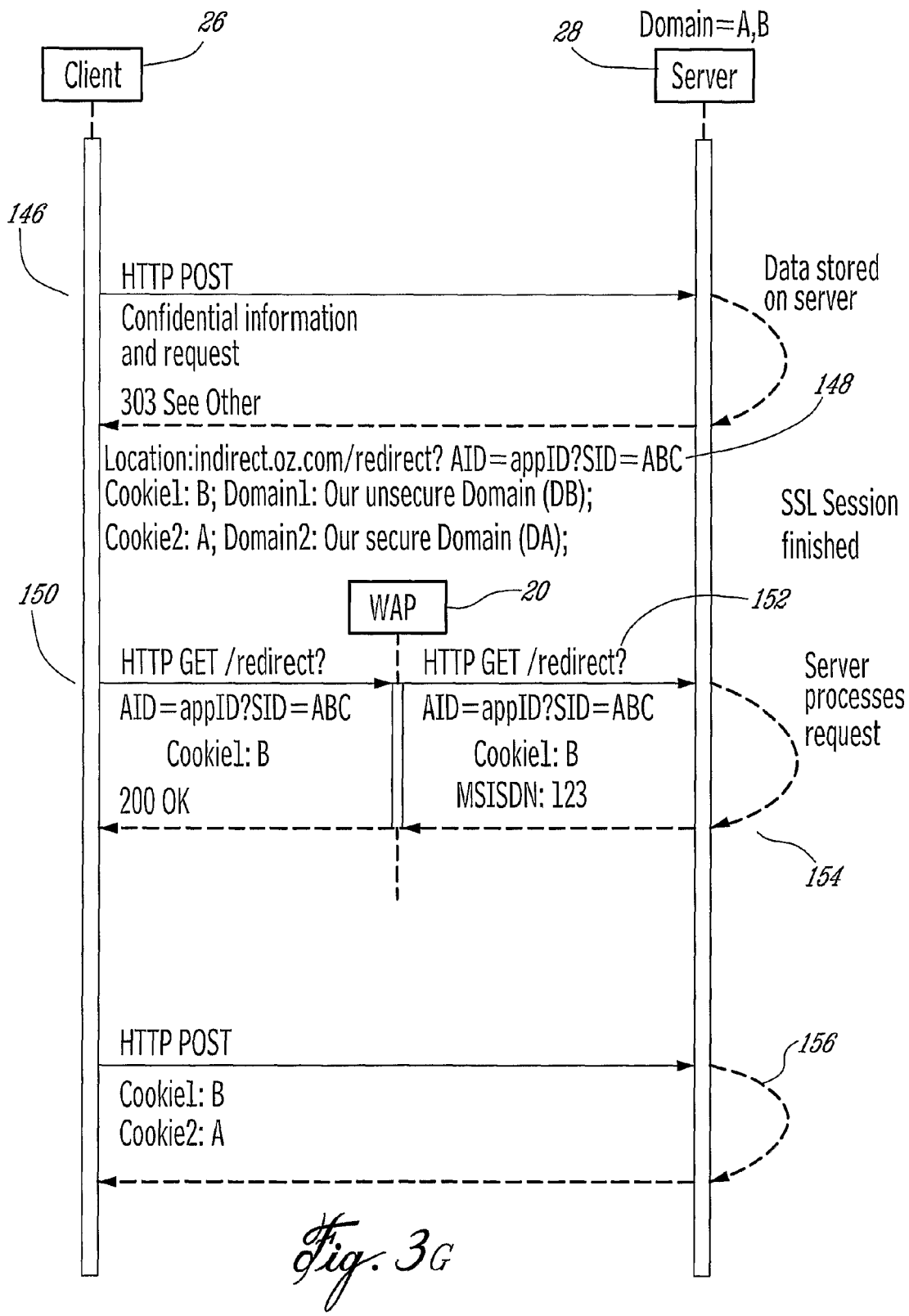

Referring now to FIG. 3G, and in accordance with a sixth alternative illustrative embodiment of the present invention, the underlying network supporting the transactions between client 26 and server 28 is trusted and therefore the use of an SSL connection and HTTPS can be dispensed with. Steps 146, 148, 150, 152, 154 and 156 are essentially the same as steps 58, 60, 62, 64, 66 and 68 as discussed hereinabove in reference to FIG. 3A with the exception that in the transaction at step 148 the server 28 provides the client 26 with a second Cookie (Cookie2:A) and domain (Domain 2, DA) indicating where the second Cookie can be used. Additionally, subsequently at step 156 both the first cookie (Cookie 1:B) and the second (Cookie 1:A) are used in communications by the client 26 with the server 28. In an additional alternative embodiment, the server 28 could replace the first Cookie (Cookie1:A) with a different Cookie (Cookie1:C), and optionally a new value for the domain, and return this to the client at step 154. This new cookie would be used together with the second Cookie (Cookie2:A) in subsequent transactions between the client 26 and server at step 156.

Figure 3H:
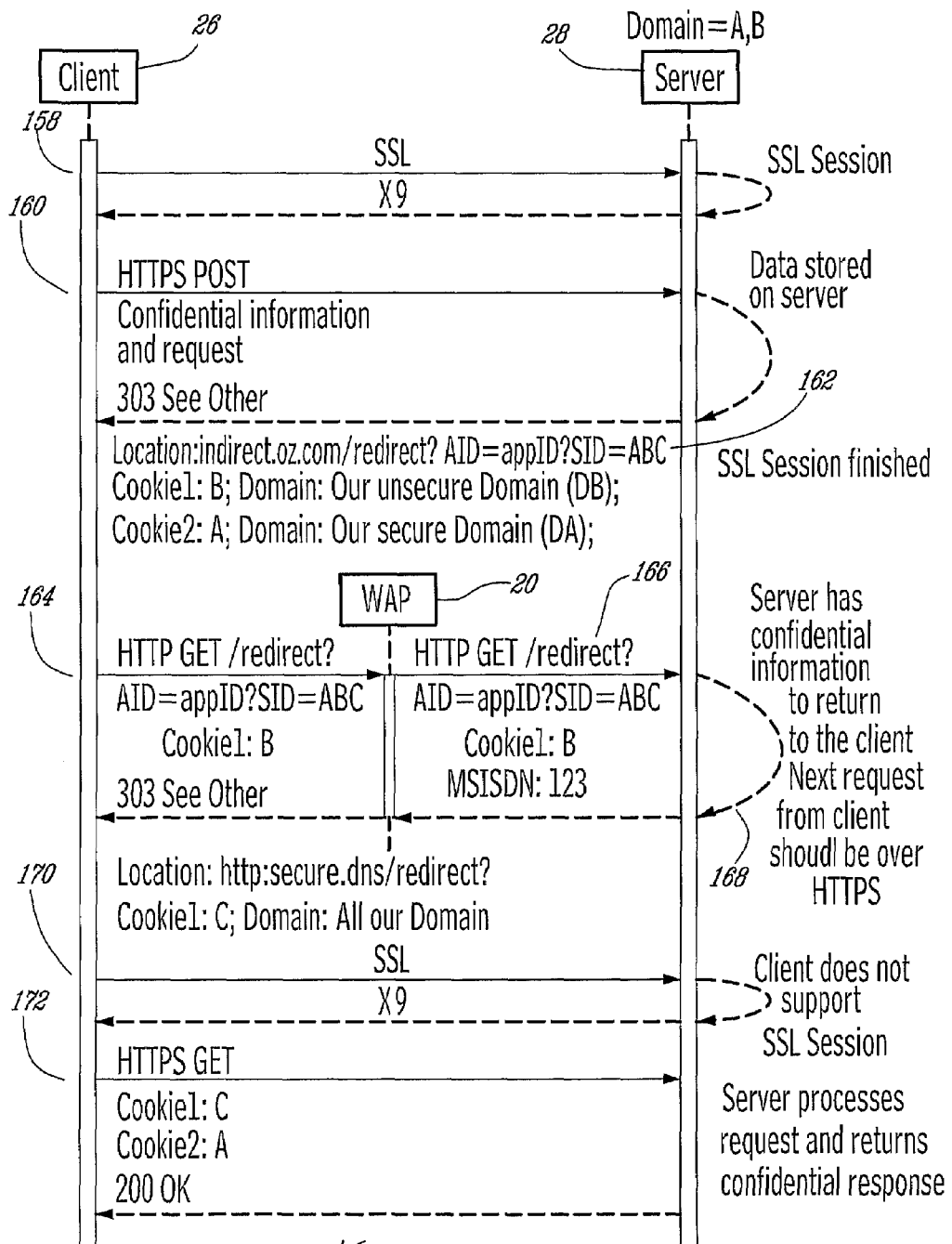
Figure 31:
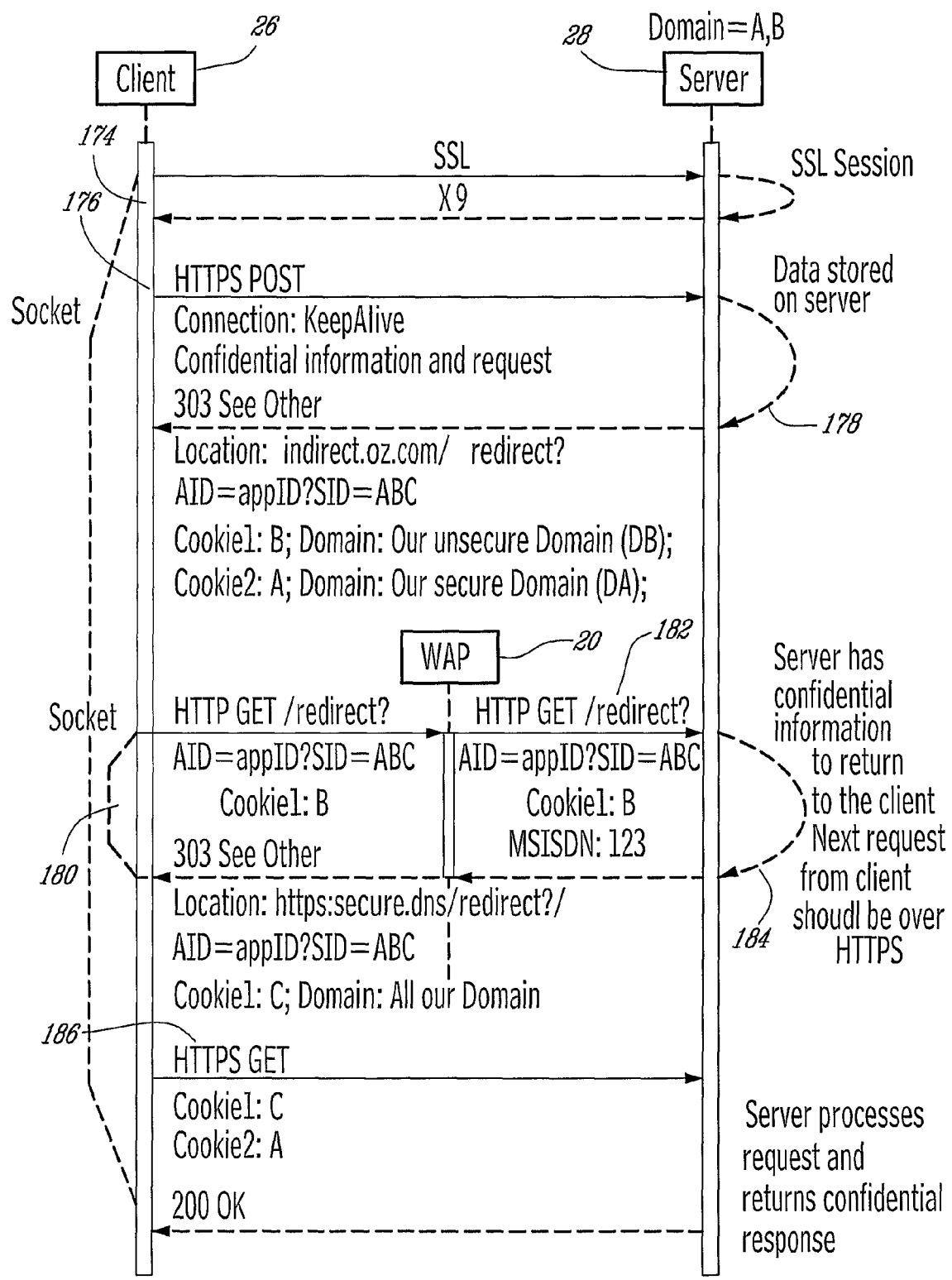

Referring now to FIG. 3H, and in accordance with a seventh alternative illustrative embodiment of the present invention, steps 158, 160, 162, 164, 166, 168, 170 and 172 are essentially the same as respectively steps 130, 132, 134, 136, 138, 140, 142 and 144 as discussed hereinabove in reference to FIG. 3F with some exceptions. In this particular embodiment, the server 28 has confidential information it wishes to transmit to the client 26 but the client does not support either SSL Sessions or HTTPS keep alive. As a result, at step 168 the server 28 re-directs the client 26 to a secure location (illustratively http:secure.dns/redirect?) and provides the client 26 with a new Cookie1:C. The client 26 subsequently establishes an SSL connection with the server 28 and subsequently uses the SSL connection to communicate with the server 28 while providing the server 28 with Cookie1:C and Cookie2:A for authentication purposes.

Referring now to FIG. 3I, and in accordance with a eighth alternative illustrative embodiment of the present invention, steps 174, 176, 178, 180, 182, 184 and 186 are essentially the same as respectively steps 130, 132, 134, 136, 138, 140 and 142 as discussed hereinabove in reference to FIG. 3F with some exceptions. The mobile client device for example supports HTTPS keep alive and therefore the HTTPS connection between the client 26 and server 28 which is set up at steps 174 and 176 can be maintained and used for subsequent transactions between the client 26 and server 28. Again, similar to the illustrative embodiment of FIG. 3H, the server 28 has confidential information it wishes communicate securely to the client 26 and therefore re-directs the client 26 to a secure location at step 184 while providing the client 26 with a new Cookie1:C as well as the AID and the SID. In response, at step 186 the client 26 can immediately use HTTPS to request the confidential information (as the SSL session is already established) while providing the Cookie1:C and the Cookie1:A to the server 28 for authentication.

Figure 3J:
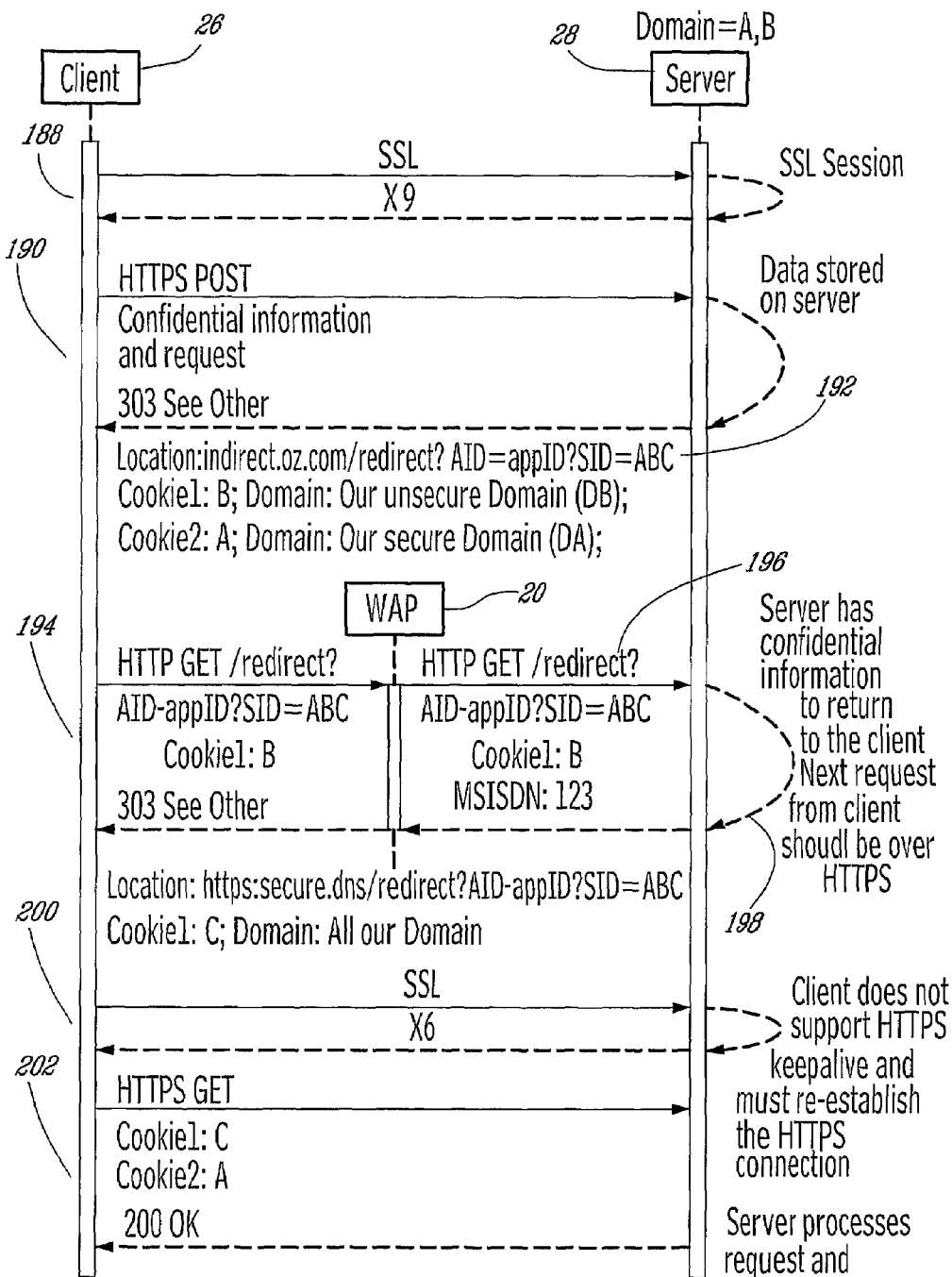

Referring now to FIG. 3J, and in accordance with a ninth alternative illustrative embodiment of the present invention, steps 188, 190, 192, 194, 196, 198, 200 and 202 are essentially the same as respectively steps 158, 160, 162, 164, 166, 168, 170 and 172 as discussed hereinabove in reference to FIG. 3H with some exceptions. The client 26 supports SSL sessions, but not HTTPS keep alive and the server 28 has confidential information it wishes to communicate to the client 26 using a secure connection and therefore re-directs the client 26 to a secure location at step 198 while providing the client 26 with a new Cookie1:C as well as the AID and the SID. As the client does not support HTTPS keep alives an SSL connection between the client 26 and server 28 must be re-established at step 200 which can then be used for subsequent HTTPS transactions between client 26 and server 28.

The above illustrated embodiments of the present invention can be advantageously used to provide solutions compliant with RFC 2616 (HTTP 1.1 June 1999, available at http://www.ietf.org/rfc/rfc2616.txt) and RFC 2818 (HTTP over TLS, May 200, available at http://www.ietf.org/rfc/rfc2818.txt), which are well-established standards both of which are incorporated herein by reference in their entirety.

Although the present invention has been described hereinabove by way of an illustrative embodiment thereof, this embodiment can be modified at will, within the scope of the present invention, without departing from the spirit and nature of the subject of the present invention.

What is claimed is:

1. A method comprising:
    causing transmission of a service request from a client to a server at a first location via a Secure Sockets Layer connection, the client being identified by a pre-defined mobile credential which is unavailable to the client and is unrelated to the service being requested;
    receiving from the server at the first location, in response to the transmitted service request, a token and a redirection to a server at a second location; and
    appending said token to said service request and causing retransmission of said service request together with said token to the server at said second location via an intermediate node that serves as a gateway between the client and the server at the second location and that has access to the mobile credential, thereby causing said intermediate node to append the mobile credential to said retransmitted service request and transmit said service request, said token and said mobile credential to the server at the second location; and
    receiving an acknowledgment of correct reception of said redirected service request in an instance in which said redirected service request includes said token.

2. The method of claim 1, wherein said server at the first location is the same as said server at the second location and said receiving act further comprises receiving an indication that said service request is to be retransmitted to said server at the first location via said intermediate node.

3. The method of claim 1, wherein said receiving act further comprises receiving a second token.

4. The method of claim 3, further comprising causing transmission of an additional request to the server at said first location wherein said additional request includes said second token.

5. The method of claim 4, wherein said additional request further includes said token.

6. The method of claim 3, wherein said second token is a Cookie.

7. The method of claim 3, further comprising receiving a third token from the server at the first location.

8. The method of claim 7, further comprising causing transmission of an additional request to the server at said first location and wherein said additional request includes said third token.

9. The method of claim 8, wherein said additional request includes said second token.

10. The method of claim 1, wherein said token is a Cookie.

11. The method of claim 1, wherein the mobile credential is a Mobile Directory Number (MDN).

12. The method of claim 1, wherein the network is trusted and further comprising prior to said causing transmission, causing an unsecured transport connection to be opened with the server at the first location and wherein said causing transmission comprises causing transmission of said service request via said transport connection.

13. The method of claim 12, further comprising closing said transport connection following said receiving act.

14. The method of claim 1, wherein at least a portion of the network interconnecting the client and the server at the first location is untrusted and further comprising prior to said causing transmission, causing a secure transport connection to be opened with the server at said first location and wherein said causing transmission comprises causing transmission of said service request via said transport connection.

15. The method of claim 14, wherein said secure transport connection is a Secure Sockets Layer (SSL) session.

16. The method of claim 1, wherein said first location is different from said second location and said receiving act further comprises receiving an indication that said service request is to be retransmitted to the server at said second location via said intermediate node.

17. The method of claim 1, further comprising:
    generating at least one additional service request;
    appending said token to each of said at least one additional service request; and
    causing transmission of said at least one additional service request to the server at the second location.

18. The method of claim 1, wherein the network is trusted and said service request is an Hypertext Transfer Protocol (HTTP) Request using the POST method.

19. The method of claim 1, wherein at least a portion of the network interconnecting the client and the server at the first location is untrusted and said service request is an Hypertext Transfer Protocol Secure (HTTPS) Request using the POST method.

20. A computer program product comprising a non-transitory computer readable medium storing computer readable program instructions, the instructions, when executed by a processor, instruct the processor to:
    generate a service request;
    cause transmission of said service request from a client to a server at a first location via a Secure Sockets Layer connection, the client being identified by a pre-defined mobile credential which is unavailable to the client and is unrelated to the service being requested;
    receive from the server at the first location, in response to the transmitted service request, a token, a redirection to a server at a second location, and an indication that said service request is to be retransmitted to the server at the second location via an intermediate node that serves as a gateway between the client and the server at the second location and that has access to the mobile credential; and append said token to said service request and causing retransmission of said service request together with said token to the server at the second location via said intermediate node, thereby causing said intermediate node to append the mobile credential to said retransmitted service request and transmit said service request, said token and said mobile credential to the server at the second location; and receive an acknowledgment of correct reception of said redirected service request in an instance in which said redirected service request includes said token.

21. The computer program product of claim 20, further comprising instructions for receiving a second token from the server, instructions for generating at least one additional service request, instructions for appending said second token to each of said at least one additional service request and instructions for causing transmission of said at least one additional service request to the server.

22. The computer program product of claim 20, wherein at least a portion of the network interconnecting the client and the server is untrusted and further comprising instructions for causing a secure transport connection to be opened with the server.

23. An apparatus comprising at least one hardware processor and at least one memory storing computer program code, the at least one memory and stored computer program code being configured, with the at least one hardware processor, to cause the apparatus to at least:

cause, by the at least one hardware processor, transmission of a service request from a client to a server at a first location via a Secure Sockets Layer connection, the client being identified by a pre-defined mobile credential which is unavailable to the client and is unrelated to the service being requested;

receive, by the at least one hardware processor from the server at the first location, in response to the transmitted service request, a token and a redirection to a server at a second location; and append, by the at least one hardware processor, said token to said service request and cause retransmission of said service request together with said token to the server at said second location via an intermediate node that serves as a gateway between the client and the server at the second location and that has access to the mobile credential, thereby causing said intermediate node to append the mobile credential to said retransmitted service request and transmit said service request, said token and said mobile credential to the server at the second location; and receive, by the at least one processor, an acknowledgment of correct reception of said redirected service request in an instance in which said redirected service request includes said token.

* * * * *